(12) United States Patent
Halla et al.

(10) Patent No.: US 8,099,130 B1
(45) Date of Patent: *Jan. 17, 2012

(54) WIRELESS SENSOR NETWORK FOR MONITORING ONE OR MORE SELECTED ENVIRONMENTAL CHARACTERISTICS

(75) Inventors: Brian L. Halla, Saratoga, CA (US); Ahmad Bahai, Lafayette, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/930,623

(22) Filed: Oct. 31, 2007

Related U.S. Application Data

(63) Continuation of application No. 10/907,533, filed on Apr. 5, 2005, now Pat. No. 7,299,068.

(51) Int. Cl.
*H04B 1/38* (2006.01)
*H04W 40/00* (2009.01)
*G08B 13/14* (2006.01)

(52) U.S. Cl. ............... 455/561; 455/449; 455/422.1; 340/572.1; 340/870.16; 340/539.22; 340/539.26

(58) Field of Classification Search ........... 455/561, 455/422.1, 449; 340/572.1, 870.16, 539.22, 340/539.26
See application file for complete search history.

(56) References Cited

U.S. PATENT DOCUMENTS

| | | |
|---|---|---|
| 6,023,223 A | 2/2000 | Baxter, Jr. |
| 6,346,885 B1 | 2/2002 | Curkendall |
| 6,563,417 B1 | 5/2003 | Shaw |
| 6,745,027 B2 | 6/2004 | Twitchell, Jr. |
| 7,049,963 B2 | 5/2006 | Waterhouse et al. |
| 7,088,229 B2 | 8/2006 | Johnson |
| 2002/0139848 A1 | 10/2002 | Catan |
| 2002/0193047 A1 | 12/2002 | Weston |
| 2003/0006907 A1 | 1/2003 | Lovegreen et al. |
| 2003/0099210 A1 | 5/2003 | O'Toole et al. |
| 2003/0144926 A1 | 7/2003 | Bodin et al. |
| 2003/0146836 A1 | 8/2003 | Wood |
| 2004/0176127 A1 | 9/2004 | Ballantyne et al. |
| 2004/0233855 A1* | 11/2004 | Gutierrez et al. ............ 370/252 |
| 2005/0140510 A1 | 6/2005 | Elwood et al. |
| 2005/0219039 A1 | 10/2005 | Allen |

* cited by examiner

*Primary Examiner* — Christopher M Brandt

(57) ABSTRACT

A wireless sensor network for monitoring one or more selected environmental characteristics. Multiple wireless signal transceivers, disposed in respective portions of a selected environment, respond to one or more wireless beacon signals by selectively collecting, processing and storing data corresponding to one or more characteristics of such portions of the selected environment, and by selectively transmitting respective wireless response signals containing selected portions of such data. Alternatively, multiple wireless signal transceivers, disposed in respective sub-networks in portions of a selected environment, collect and convey data corresponding to one or more characteristics of such selected environment portions.

2 Claims, 4 Drawing Sheets

WIRELESS SENSOR NETWORK FOR MONITORING ONE OR MORE SELECTED ENVIRONMENTAL CHARACTERISTICS

RELATED APPLICATIONS

This application is a continuation of U.S. patent application Ser. No. 10/907,533, filed on Apr. 5, 2005.

BACKGROUND OF THE INVENTION

1. Field of the Invention

The present invention relates to devices for monitoring environmental characteristics, and in particular, to a network of devices for monitoring and reporting on environmental characteristics.

2. Description of the Related Art

As various forms of sensors have been developed to become smaller, more efficient and less expensive, it has become increasingly practical to develop and deploy systems for monitoring and reporting on various environmental conditions or characteristics. Such conditions or characteristics include, among others and without limitation, humidity, pressure, electromagnetic radiation, light, acceleration, various chemical concentrations, and temperature. Indeed, the range or types of conditions or characteristics that can be monitored are limited only by the sensors used to provide sufficient and suitable signals for the circuitry needed for processing the data represented by such signals.

For example, many products, particularly food products, require a controlled environment during some or all stages of production, shipping and handling, and sales. Particularly for food products, temperature is often the most critical environmental characteristic to be maintained. Food products must often be shipped for long distances to their final destination, with trips often taking several days, thereby requiring that the food be frozen or refrigerated during such trips. The freshness and safety of the food product depends upon proper maintenance of the temperature. This is particularly true for foods such as meat, fish and poultry, where even relatively small temperature excursions outside the desired range, for even only short durations, can be dangerous due to spoilage.

It is well known in the art for distributors of frozen and refrigerated foods to place temperature-sensitive elements (e.g., on adhesive strips) in or on the containers in which the food products are shipped. Such devices will indicate whether the shipping container has been allowed to rise above a threshold temperature at any point during the trip. However, nearly indicating whether such temperature threshold has been crossed, without any further information about the duration or timing of such temperature change is generally not sufficient to fully assess the effects of such temperature changes.

Accordingly, it would be desirable to have a system for monitoring and reporting on one or more characteristics, such as temperature, within a defined environment.

SUMMARY OF THE INVENTION

A wireless sensor network for monitoring one or more selected environmental characteristics. Multiple wireless signal transceivers, disposed in respective portions of a selected environment, respond to one or more wireless beacon signals by selectively collecting, processing and storing data corresponding to one or more characteristics of such portions of the selected environment, and by selectively transmitting respective wireless response signals containing selected portions of such data. Alternatively, multiple wireless signal transceivers, disposed in respective sub-networks in portions of a selected environment, collect and convey data corresponding to one or more characteristics of such selected environment portions.

In accordance with one embodiment of the presently claimed invention, a wireless sensor network for monitoring one or more selected environmental characteristics includes a plurality of wireless signal transceivers, each of which is disposed within a respective portion of a selected environment, and responsive to one or more wireless beacon signals at least in part by selectively transmitting one or more respective wireless response signals. Each wireless signal transceiver includes at least one signal transducer, processing and control circuitry, memory circuitry and data collection circuitry. The at least one signal transducer is to convert the one or more wireless beacon signals at least in part to one or more corresponding incoming electrical signals, and to convert one or more outgoing electrical signals at least in part to the one or more wireless response signals. The processing and control circuitry is coupled to the at least one signal transducer and responsive to the one or more incoming electrical signals by selectively processing at least a portion of the one or more incoming electrical signals and at least a selected portion of a plurality of data, providing a plurality of control signals, and providing the one or more outgoing electrical signals. The memory circuitry is coupled to at least the processing and control circuitry and responsive to at least a first portion of the plurality of control signals by storing at least a first portion of the plurality of data and providing at least a second portion of the plurality of data. The data collection circuitry is coupled to at least the processing and control circuitry and responsive to at least a second portion of the plurality of control signals and at least one sensor signal corresponding to one or more characteristics of the respective portion of the selected environment by providing the first portion of the plurality of data. The one or more outgoing electrical signals selectively correspond to at least one of the one or more characteristics.

In accordance with another embodiment of the presently claimed invention, an ad hoc wireless sensor data network for monitoring one or more selected environmental characteristics includes one or more master wireless signal transceivers and a plurality of ad hoc wireless signal transceivers. The one or more master wireless signal transceivers communicate via a plurality of wireless signals. The plurality of ad hoc wireless signal transceivers, each of which is disposed within a respective portion of a selected environment, communicates with the one or more master wireless signal transceivers via the plurality of wireless signals. The plurality of ad hoc wireless signal transceivers, in at least partial response to a plurality of respective sensor signals, transmits a plurality of respective ad hoc wireless signals as at least a portion of the plurality of wireless signals and selectively corresponding to at least one of one or more characteristics of the selected environment. The one or more master wireless signal transceivers, responsive to reception of the plurality of respective ad hoc wireless signals, determine a location of at least one of the plurality of ad hoc wireless signal transceivers in a respective spatial relation to at least one of the one or more master wireless signal transceivers.

In accordance with another embodiment of the presently claimed invention, an ad hoc wireless sensor data network for monitoring one or more selected environmental characteristics includes one or more master wireless signal transceivers and a plurality of ad hoc wireless signal transceivers. The one or more master wireless signal transceivers communicate via a plurality of wireless signals. The plurality of ad hoc wireless signal transceivers, each of which is disposed within a respective portion of a selected environment, communicates with the one or more master wireless signal transceivers via the plurality of wireless signals. The plurality of ad hoc wireless signal transceivers, in at least partial response to a plurality of respective sensor signals, transmits a plurality of respective ad hoc wireless signals as at least a portion of the plurality of wireless signals and selectively corresponding to at least one of the one or more characteristics. The one or more master wireless signal transceivers, responsive to reception of the plurality of respective ad hoc wireless signals, determine a location of at least one of the plurality of ad hoc wireless signal transceivers in a respective spatial relation to at least another one of the plurality of ad hoc wireless signal transceivers.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
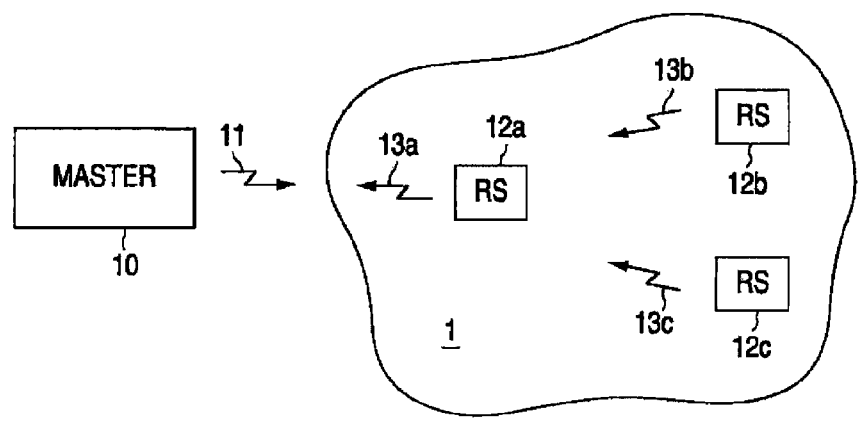
FIG. 1 illustrates deployment of a sensor network for reporting on selected environmental characteristics in accordance with one embodiment of the presently claimed invention.

Referring to FIG. 1, in accordance with one embodiment of the presently acclaimed invention, a sensor network is established within a predetermined environment 1 for monitoring one or more environmental characteristics (e.g., temperature, humidity, pressure, etc., as discussed above). Within this environment 1, a number of remote sensor assemblies 12 are disposed for sensing respective portions of the environment 1. For example, one of the remote sensor assemblies 12a can be used to sense, and ultimately report on, an environmental characteristic within its immediate vicinity, such as temperature. Remote from the sensor network is a master terminal or controller 10 that sends out one or more wireless signals 11 for interacting, e.g., controlling or triggering, one or more of the sensor assemblies 12 within the sensor network. For example, the master 10 can send out one or more wireless signals 11 (e.g., radio frequency (RF), microwave, infrared or optical) which serves as a beacon or triggering signal in response to which the remote sensor assemblies 12 transmit respective wireless signals 13 containing information about the environmental characteristics being sensed.

As should be readily understood by one of ordinary skill in the art, the sensor network and master terminal which interacts or otherwise controls the sensor network can be implemented in many of a number of well known ways. As noted above, the wireless signal transmitted and received by the master and remote sensors are preferably, though not necessarily limited to, wireless signals which are not line-of-sight, such as RF or microwave signals. Further, such a network can be in the form of a master-slave network in which the master originates and controls all communication with the respective remote sensor assemblies, or alternatively, can be what is sometimes referred to as a mesh network in which the remote sensor assemblies may communicate with each other independently from or under the supervision of the master.

Figure 2:
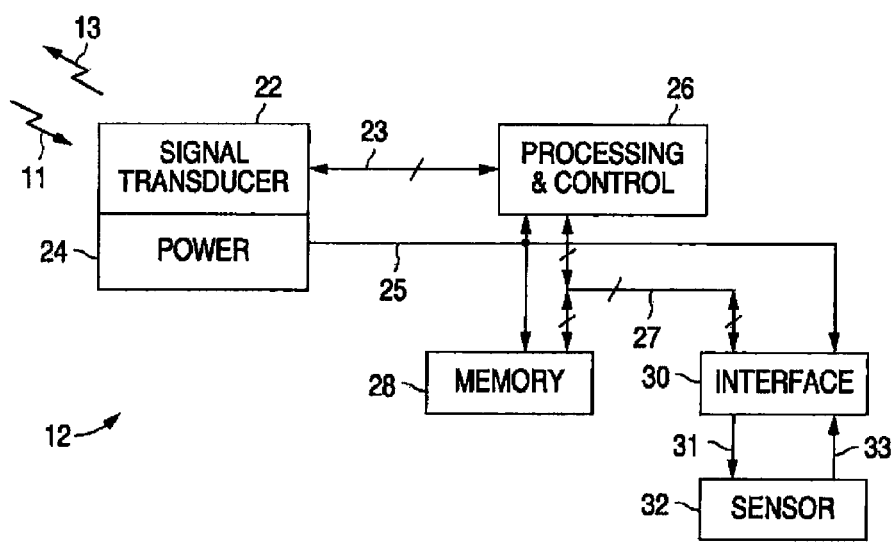
FIG. 2 is a simplified functional block diagram of a sensor assembly for use in the sensor network of FIG. 1 in accordance with another embodiment of the presently claimed invention.

Referring to FIG. 2, a remote sensor assembly 12 in accordance with one embodiment of the presently claimed invention includes a signal transducer 22. This signal transducer 22 preferably includes one or more signal transducing elements appropriate for converting the incoming wireless signal 11 to an incoming electrical signal and to convert an outgoing electrical signal to the outgoing wireless signal 13. For example, for RF signals communications, such a signal transducer 22 would include one or more antenna elements which are well known in the art and can be implemented in many well known ways. In the case of optical signal communications, such signal transducer 22 would include an optical sensor for sensing and converting the incoming optical signal 11 to an incoming electrical signal, and an optical signal emitter for converting the outgoing electrical signal to the outgoing optical signal 13.

The sensor assembly 12 also includes a power source 24, processing and control circuitry 26, memory circuitry 28 and sensor interface circuitry 30, all interconnected substantially as shown. Additionally, a sensor 32 may also be included. Typically, all such elements are integrated or otherwise packaged in some form of unitary design in accordance with well known electronic circuit packaging techniques.

As noted above, the incoming wireless signal 11, e.g., a beacon signal, is received by the signal transducer 22 and converted to appropriate baseband control or data signals for communication via a signal interface 23 to the processing and control circuitry 26 (e.g., a microprocessor or microcontroller). For example, in the case of RF communications, the incoming RF signal 11 is initially converted to an RF signal which is then processed in accordance with well known RF signal processing techniques to produce the corresponding baseband control or data signals. Such signal transducer circuitry is well known in the art and can be implemented in many forms in accordance with well known design techniques. In response to these received signals, the processing and control circuitry 26, via an interface bus 27, sends control signals to and accesses data from the memory 28 and sensor interface 30 (discussed in more detail below). The processing and control circuitry 26 processes the data it receives from the memory 28 or interface 30 and provides the appropriate response signals via the interface 23 to the signal transducer 22 for transmission as the wireless response signal 13.

The power source 24 provides power to the signal transducer circuitry 22, as well as to the processing and control circuitry 26, memory 28 and sensor interface 30 (e.g., via a power bus 25) during operation of the sensor assembly 12. Preferably, the memory 28 is nonvolatile, thereby avoiding need for electrical power when the sensor assembly 12 is not responding to an incoming control or query signal 11 from the master 10. The power source 24 can be either a battery or some form of power conversion circuitry, many types of which are well known in the art. For example, if the sensor assembly 12 is an "active" assembly, the power source 24 can be a battery, thereby making power available at all times as needed. However, if the sensor assembly 12 is "passive", the power source 24 can be a power conversion circuit which converts (or "harvests") at least a portion of the incoming signal 11 energy to DC power for use by the signal transducer circuitry 22, processing and control circuitry 26, memory 28 and interface 30.

Referring again to FIG. 1, it should be noted that the sensor network of the presently claimed invention can be operated or controlled in a number of ways. For example, as noted above, the control or query signal 11 from the master 10 can be a beacon signal which is intended for reception by all of the remote sensor assemblies 12. Following receipt of such a beacon signal 11, each remote sensor assembly 12 can respond in one or more of a number of ways. For example, responsive to the control or query signal 11, a remote sensor assembly 12 can prompt its associated sensor 32 (FIG. 2) via a control signal 31 to retrieve sensor data 33, which is then selectively stored in the memory 28 or immediately provided to the processing and control circuitry 26. The processing and control circuitry 26 can then process such sensor data, either immediately, or later after its retrieval from the memory 28, and provide it for transmission via the signal transducer circuitry 22. Alternatively, the sensor assembly 12 can respond to successive query or control signals 11 by accessing and storing successive values of sensor data within the memory 28 for later retrieval and processing following reception of a later query or control signal 11 specifically requesting such data.

As another alternative, following reception of one or more control or query signals 11, and collection, storage and processing of sensor data, each sensor assembly 12 can then begin reporting back to the master 10 by transmitting its respective wireless response signal 13. Such responsive signal transmissions can be initiated in a predetermined sequence according to a hierarchy or prioritization of the various sensor assemblies 12 so as to avoid signal "collisions". Further alternatively, each respective sensor assembly 12 can transmit its wireless response signal 13 at a different frequency.

Figure 3:
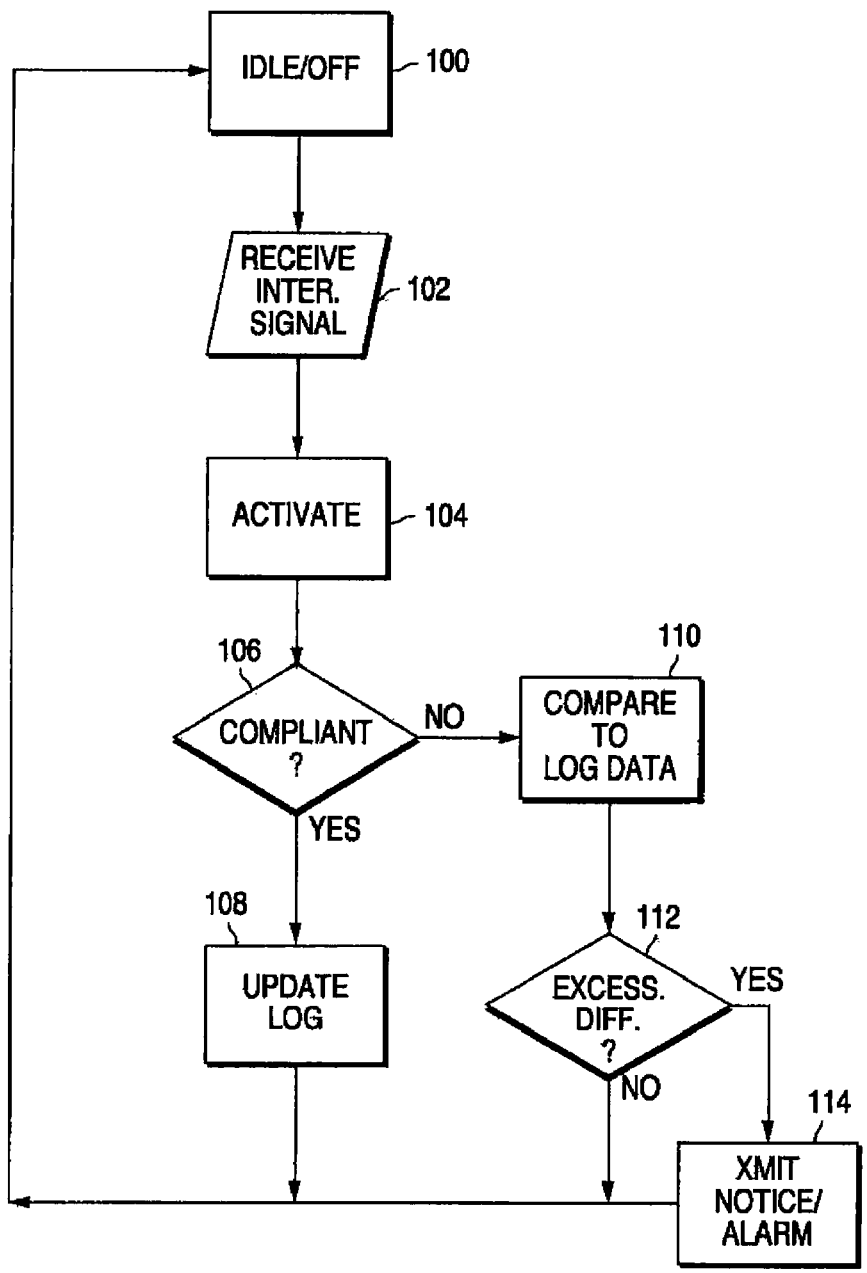
FIG. 3 is a flowchart of an operation of a sensor assembly, such as that depicted in FIG. 2, in accordance with another embodiment of the presently acclaimed invention.

Referring to FIG. 3, a method of operating a sensor assembly 12, such as that depicted in FIG. 2, in accordance with one embodiment of the presently claimed invention includes the following. Initially, the device is in an idle or off state 100. At some point 102 in time, the query or control signal 11 is received, following which activation 104 of the sensor assembly 12 occurs. It is during this activation stage 104 that the signal transducer 22 converts the incoming signal 11 to appropriate baseband control or data signals for controlling or further processing within the sensor assembly 12. Additionally, for a passive sensor assembly 12, it is during this activation stage 104 that at least a portion of the incoming signal 11 is used for generating DC power for the various stages of the sensor assembly 12.

At the next stage 106, the sensor data (e.g., retrieved by the processing and control circuitry 26 via the interface 30 and signal/data bus 27) is tested or compared against a threshold value or range of values for compliance. For example, in the case of temperature, the current temperature, as determined by a temperature sensor, would be compared to a range of values as defined by minimum and maximum temperature values for compliance.

If the measured parameter is compliant (e.g., within the desired range of values, or not of a value which transcends a threshold value), a table or log of parameter values is updated (e.g., within the memory 28) at stage 108. If the measured parameter is not compliant, it is then compared or tested at stage 110 against the table or log of parameter values (e.g., stored within the memory 28). At stage 112, it is determined whether the present parameter value differs by an excessive amount from one or more of the values stored within the data log. If such difference is excessive, a notice or alarm signal is generated at stage 114 for transmission back to the master 10.

Following stages 108, 112 (if the difference is not excessive) and 114, operation returns to the idle or off state 100.

Figure 4:
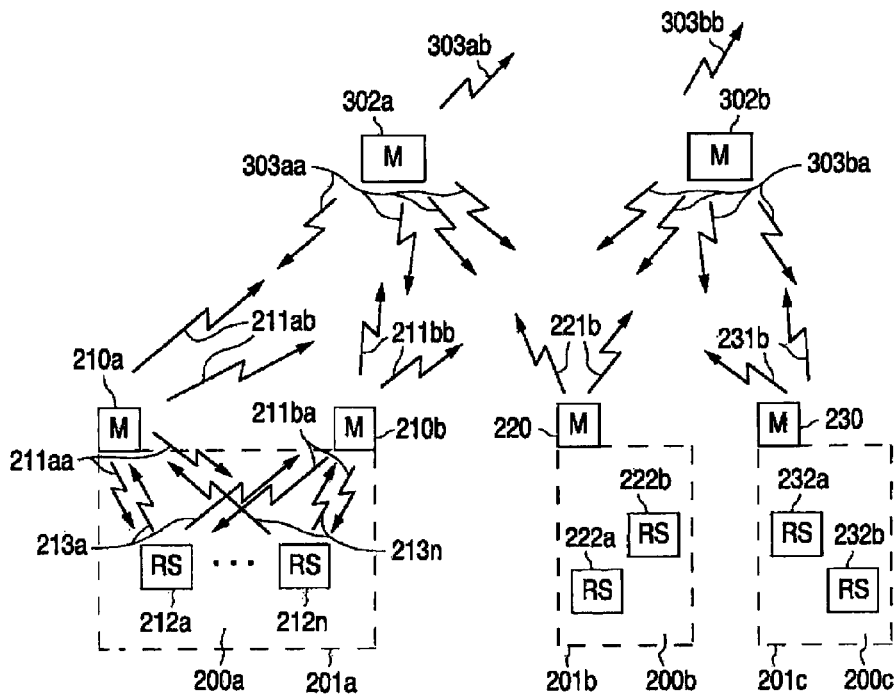
FIG. 4 illustrates deployments of remote sensors as parts of multiple sub-networks in accordance with another embodiment of the presently claimed invention.

Referring to FIG. 4, in accordance with another embodiment of the presently claimed invention, multiple remote sensor assemblies can be deployed in the form of multiple sub-networks 200*a*, 200*b*, 200*c* which are associated with respective portions 201*a*, 201*b*, 201*c* of the selected environment. In this example, one environment portion 201*a* has a sub-network 200*a* of N remote sensor assemblies 212*a*, . . . , 212*n*, while two additional environment portions 201*b*, 201*c* have sub-networks 200*b*, 200*c* with each having two remote sensor assemblies 222*a*, 222*b*, 232*a*, 232*b*. In the first sub-network 200*a*, one or more master signal transceivers 210*a*, 210*b*, transmit their wireless signals 211*aa*, 211*ba* intended for reception by the remote sensor assemblies 212*a* . . . , 212*n*. In turn, the remote sensor assemblies 212*a*, . . . , 212*n* transmit their respective response signals 213*a*, . . . , 213*n* for reception by the master transceivers 210*a*, 210*b*. The other sub-networks 200*b*, 200*c* operate in a similar manner.

In turn, these sub-networks 200*a*, 200*b*, 200*c* can together form a larger sub-network for which their respective master signal transceivers 210*a*, 210*b*, 220, 230 now serve as "remote transceivers" with respect to a set of higher level transceivers 302*a*, 302*b*. Accordingly, the lower level master transceivers 210*a*, 210*b*, 220, 230 transmit signals 211*ab*, 211*bb*, 221*b*, 231*b* for reception by the higher level transceivers 302*a*, 302*b*. These transceivers 302*a*, 302*b*, in turn communicate with the lower level transceivers 210*a*, 210*b*, 220, 230 with their own signals 303*aa*, 303*ba*. At this level, either the higher level transceivers 302*a*, 302*b* or the lower level transceivers 210*a*, 210*b*, 220, 230 can initiate communications or act in a responsive manner. Of course, the higher level transceivers 302*a*, 302*b* can also communicate further via additional transmission signals 303*ab*, 303*bb* with other devices or systems. Accordingly, multiple sub-networks can be nested as part of ever larger networks, depending upon the application.

One example of such a networked system can be where each of the lowest sub-networks 200a, 200b, 200c corresponds to a container in which the remote sensor assemblies 212a, ..., 212n, 222a, 222b, 232a, 232b are disposed or otherwise contained within their respective environments 201a, 201b, 201c. As discussed above, these remote sensor assemblies 212a, ..., 212n, 222a, 22b, 232a, 232b monitor their respective portions of these environments 201a, 201b, 201c, and convey data corresponding to the one or more characteristics for which they are responsible for monitoring. For example, the remote sensor assemblies 212a, ..., 212n, 222a, 22b, 232a, 232b might collect visual image data which, after all sensor data has been combined and properly processed, provides visual profiles of the various environment portions 201a, 201b, 201c. In turn, these profiles can be further combined to form a larger, or composite, profile for the overall environment. Alternatively, each of the remote sensor assemblies can monitor its ambient temperature such that when all such temperature data is collected and processed, e.g., via the master signal transceivers 210a, 210b, 220, 230, temperature gradients can be determined for the various environment portions 201a, 201b, 201c.

Figure 5:
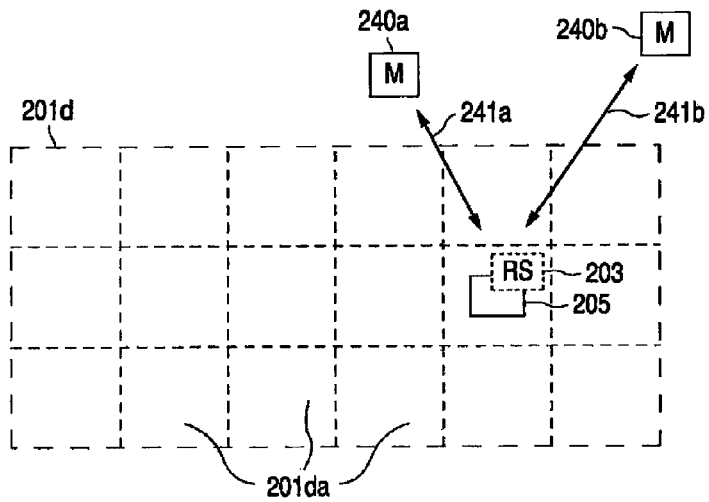
FIG. 5 illustrates location awareness and spatial error correction provided with a sensor network in accordance with the presently claimed invention.

Referring to FIG. 5, such sensor networks are often in the from of ad hoc networks, meaning that deployment or activation of the various remote sensor assemblies may take place at any time and under various, and even variable, conditions. As a result, errors or other forms of discrepancies may arise in the sensor data or the manner in which the sensor data is initially transmitted or later conveyed. For example, particularly in the case of remote sensor assemblies responsible for collecting image data, the actual spatial location of each remote sensor assemble can be critical so as to ensure that the overall image profile can be properly reconstructed based on the transmitted image data. As shown, a portion 201d of the environment for which remote sensor assemblies are responsible for collecting data may be subdivided into multiple cells 201da. In one of these cells, the remote sensor assembly may be disposed in such a way or may be transmitting its signals in a way that its apparent spatial location 203, e.g., relative to the master signal transceivers 240a, 240b, may be shifted from or appear to be in a location other than the expected spatial location 205.

Accordingly, it may be important that the data processing by the master transceivers 240a, 240b be able to account for this. This is often a simple matter when multiple master signal transceivers 240a, 240b are involved, since they can take advantage of signal triangulation whereby the signal transmitted by the remote sensor assembly, which travels over two distinct signal paths 241a, 241b to reach the master transceivers 240a, 240b, can be analyzed or processed, with the respective results being compared to determine the spatial location of the remote sensor assembly, or the location within the environment (e.g., the specific cell 201da) which the responsible remote sensor assembly is monitoring. For example, one common technique involves analysis of the phases of the remote sensor assembly signal being received at each of the master signal transceivers 240a, 240b to determine the lengths or difference in the lengths of the signal paths 241a, 241b, following which the location of the remote sensor assembly from which the signal originates can be determined.

Figure 6A:
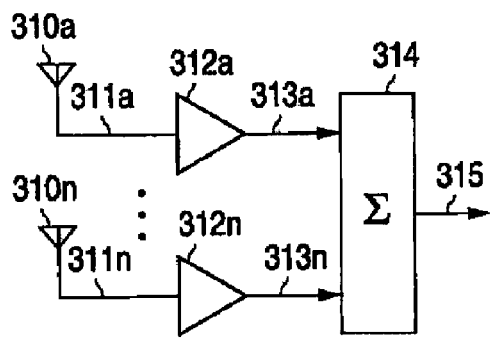
FIGS. 6A, 6B and 6C depict alternative techniques for signal diversity combining suitable for use in sensor networks according to the presently claimed invention.

Referring to FIG. 6A, one technique for improving signal reception and differentiation involves the use of space diversity with respect to the antennas. For example, a set of N antennas 310a, ..., 310n can be used to convert the incoming wireless signals to electrical signals 311a, ..., 311n which are processed (e.g., amplified and filtered) in downstream circuitry 312a, ..., 312n, with the resulting signals 313a, ..., 313n being added in a signal combiner 314 (e.g., a signal summer) to produce the final receive signal 315.

Figure 6B:
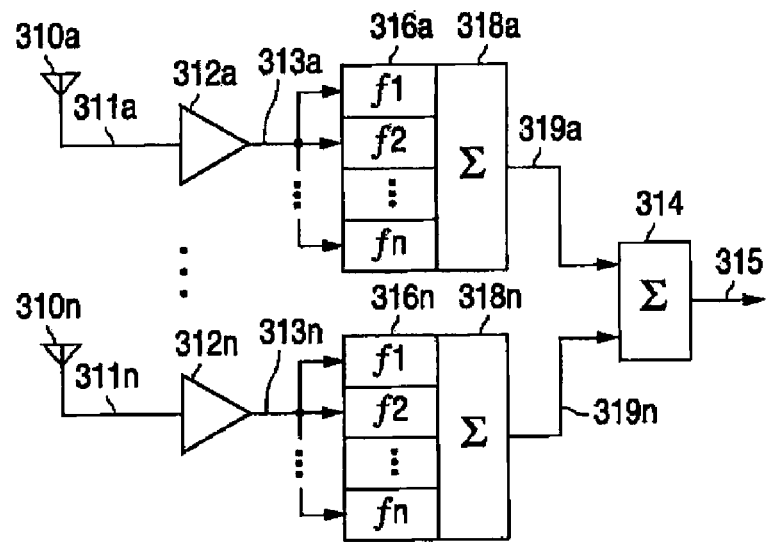

Referring to FIG. 6B, an alternative technique is the use of both spatial and frequency diversity. With this technique, the processed incoming signals 313a, ..., 313n are further processed in circuitry 316a, ..., 316n operating over multiple frequency ranges f1, f2, ..., fn, with the resulting processed signals being combined in signal combiners 318a, ..., 318n to produce intermediate signals 319a, ..., 319n which are further combined in another signal combiner 314 to produce the final receive signal 315.

More detailed discussions of wireless signal transceivers using signal diversity combining techniques can be found in: U.S. patent application Ser. No. 10/818,061, filed Apr. 5, 2004, for an "Apparatus For Pre-Scaling Data Packets With Multiple Signal Gain Coefficients In A SIMO/MISO Transceiver For Communication With A SISO Transceiver"; U.S. patent application Ser. No. 10/818,147, filed Apr. 5, 2004, for an "Apparatus For Generating Signal Gain Coefficients For A SIMO/MISO Transceiver For Providing Packet Data Communication With A SISO Transceiver"; and U.S. patent application Ser. No. 10/818,151, filed Apr. 5, 2004, for a "SIMO/MISO Transceiver For Providing Packet Data Communication With SISO Transceiver". The disclosure of each of these documents is incorporated herein by reference.

Figure 6C:
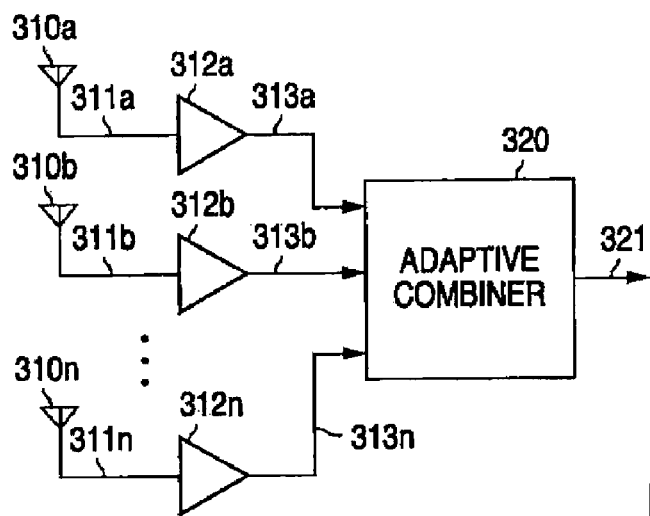

Referring to FIG. 6C, a further alternative diversity signal combining technique involves the use of an adaptive antenna array. In this technique, the processed received signals 313a, 313b, ..., 313n are processed according to well-known techniques in an adaptive combiner 320, whereby the various signals 313a, 313b, ..., 313n are selectively weighted (e.g., selectively amplified, attenuated or filtered) and combined to produce the final receive signal 321 for further downstream processing.

Various other modifications and alternations in the structure and method of operation of this invention will be apparent to those skilled in the all without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an ad hoc wireless sensor data network for monitoring one or more selected environmental characteristics, comprising:
   one or more master wireless signal transceivers that communicate via a plurality of wireless signals; and
   a plurality of ad hoc wireless signal transceivers, each of which is disposed within a respective portion of a selected environment, that communicates with said one or more master wireless signal transceivers via said plurality of wireless signals;
   wherein
   said plurality of ad hoc wireless signal transceivers, in at least partial response to a plurality of respective sensor signals, transmits a plurality of respective ad hoc wireless signals as at least a portion of said plurality of wireless signals and selectively corresponding objectively to at least one of one or more characteristics of said selected environment,
   said one or more master wireless signal transceivers, responsive to reception of said plurality of respective ad hoc wireless signals, dynamically determine an actual location of at least one of said plurality of ad hoc wireless signal transceivers in a respective spatial relation to at least one of said one or more master wireless signal transceivers, and each one of said plurality of ad hoc wireless signal transceivers includes at least one signal transducer to convert one or more of said plurality of wireless signals at least in part to one or more corresponding incoming electrical signals, and to convert one or more outgoing electrical signals at least in part to one or more wireless response signals, processing and control circuitry coupled to said at least one signal transducer and responsive to said one or more incoming electrical signals by selectively processing at least a portion of said one or more incoming electrical signals and at least a selected portion of a plurality of data, providing a plurality of control signals, and providing said one or more outgoing electrical signals, memory circuitry coupled to at least said processing and control circuitry and responsive to at least a first portion of said plurality of control signals by storing at least a first portion of said plurality of data and providing at least a second portion of said plurality of data, and data collection circuitry coupled to at least said processing and control circuitry and responsive to at least a second portion of said plurality of control signals and at least one sensor signal corresponding to one or more characteristics of said respective portion of said selected environment by providing said first portion of said plurality of data, wherein said one or more outgoing electrical signals selectively correspond to at least one of said one or more characteristics.

2. An apparatus including an ad hoc wireless sensor data network for monitoring one or more selected environmental characteristics, comprising:

one or more master wireless signal transceivers that communicate via a plurality of wireless signals; and a plurality of ad hoc wireless signal transceivers, each of which is disposed within a respective portion of a selected environment, that communicates with said one or more master wireless signal transceivers via said plurality of wireless signals;

wherein said plurality of ad hoc wireless signal transceivers, in at least partial response to a plurality of respective sensor signals, transmits a plurality of respective ad hoc wireless signals as at least a portion of said plurality of wireless signals and selectively corresponding objectively to at least one of one or more characteristics of said selected environment, said one or more master wireless signal transceivers, responsive to reception of said plurality of respective ad hoc wireless signals, dynamically determine an actual location of at least one of said plurality of ad hoc wireless signal transceivers in a respective spatial relation to at least another one of said plurality of ad hoc wireless signal transceivers, and each one of said plurality of ad hoc wireless signal transceivers includes at least one signal transducer to convert one or more of said plurality of wireless signals at least in part to one or more corresponding incoming electrical signals, and to convert one or more outgoing electrical signals at least in part to one or more wireless response signals, processing and control circuitry coupled to said at least one signal transducer and responsive to said one or more incoming electrical signals by selectively processing at least a portion of said one or more incoming electrical signals and at least a selected portion of a plurality of data, providing a plurality of control signals, and providing said one or more outgoing electrical signals, memory circuitry coupled to at least said processing and control circuitry and responsive to at least a first portion of said plurality of control signals by storing at least a first portion of said plurality of data and providing at least a second portion of said plurality of data, and data collection circuitry coupled to at least said processing and control circuitry and responsive to at least a second portion of said plurality of control signals and at least one sensor signal corresponding to one or more characteristics of said respective portion of said selected environment by providing said first portion of said plurality of data, wherein said one or more outgoing electrical signals selectively correspond to at least one of said one or more characteristics.

* * * * *